US011945186B2

(12) United States Patent
Varotto et al.

(10) Patent No.: US 11,945,186 B2
(45) Date of Patent: Apr. 2, 2024

(54) MACHINE AND METHOD FOR FORMING CONTAINERS FROM BLANKS

(71) Applicant: AZIONARIA COSTRUZIONI MACCHINE AUTOMATICHE A.C.M.A. S.P.A., Bologna (IT)

(72) Inventors: Mauro Varotto, Bologna (IT); Lucio Librio, Bologna (IT); Marco Ghini, Monte San Pietro (IT); Domenico Polidori, Pescara (IT)

(73) Assignee: AZIONARIA COSTRUZIONI MACCHINE AUTOMATICHE A.C.M.A. S.P.A., Bologna (IT)

( * ) Notice: Subject to any disclaimer, the term of this patent is extended or adjusted under 35 U.S.C. 154(b) by 1 day.

(21) Appl. No.: 17/633,484

(22) PCT Filed: Jul. 24, 2020

(86) PCT No.: PCT/IB2020/056995
§ 371 (c)(1),
(2) Date: Feb. 7, 2022

(87) PCT Pub. No.: WO2021/024079
PCT Pub. Date: Feb. 11, 2021

(65) Prior Publication Data

US 2022/0281202 A1 Sep. 8, 2022

(30) Foreign Application Priority Data

Aug. 8, 2019 (IT) ........................ 102019000014418

(51) Int. Cl.
*B31B 50/44* (2017.01)
*B31B 50/00* (2017.01)
(Continued)

(52) U.S. Cl.
CPC .......... *B31B 50/442* (2017.08); *B31B 50/003* (2017.08); *B31B 50/594* (2018.05);
(Continued)

(58) Field of Classification Search
CPC ... B31B 50/442; B31B 50/003; B31B 50/594; B31B 2100/0022; B31B 2120/302;
(Continued)

(56) References Cited

U.S. PATENT DOCUMENTS 3,800,681 A * 4/1974 Corderoy ................ B31B 70/00
493/449
2013/0039731 A1* 2/2013 Lundgren ............. B31B 50/786
414/815

(Continued)

FOREIGN PATENT DOCUMENTS

CN 1275515 C 12/2000
CN 101489872 A 7/2009

(Continued)

OTHER PUBLICATIONS

International Search Report and Written Opinion dated Sep. 18, 2020 from counterpart International Patent Application No. PCT/IB2020/056995.

(Continued)

*Primary Examiner* — Andrew M Tecco
*Assistant Examiner* — Nicholas E Igbokwe
(74) *Attorney, Agent, or Firm* — SHUTTLEWORTH & INGERSOLL, PLC; Timothy J. Klima

(57) ABSTRACT

Described are a machine and a method for forming containers from blanks, including a plurality of shaping hoppers, an endless conveyor which defines a feed path and on which the hoppers are mounted in succession and a plurality of pushing elements which are movable in such a way as to follow the respective shaping hoppers along at least a stretch of the (Continued)

feed path and which have a to-and-fro operating movement towards and away from the respective hopper along a direction transverse, preferably perpendicular, to the feed path. The machine also includes folding means disposed along the feed path downstream of the pushing elements and configured to produce, respectively, a top closure and/or a bottom closure of the tubular blank.

13 Claims, 6 Drawing Sheets

(51) Int. Cl.

| | |
|---|---|
| ***B31B 50/59*** | (2017.01) |
| *B31B 100/00* | (2017.01) |
| *B31B 110/10* | (2017.01) |
| *B31B 110/35* | (2017.01) |
| *B31B 120/10* | (2017.01) |
| *B31B 120/30* | (2017.01) |

(52) U.S. Cl.
CPC ... *B31B 2100/0022* (2017.08); *B31B 2110/10* (2017.08); *B31B 2110/35* (2017.08); *B31B 2120/102* (2017.08); *B31B 2120/302* (2017.08)

(58) Field of Classification Search
CPC ............. B31B 2110/10; B31B 2110/35; B31B 2120/102; B31B 50/0044; B31B 50/32; B31B 50/326
USPC ................................ 493/165, 182, 167, 169
See application file for complete search history.

(56) References Cited

U.S. PATENT DOCUMENTS

| | | | | |
|---|---|---|---|---|
| 2013/0090223 A1* | 4/2013 | Begin | B31B 50/00 493/422 |
| 2017/0050403 A1 | 2/2017 | Ruegg et al. | |
| 2018/0215118 A1* | 8/2018 | Sassi | B65B 59/005 |

FOREIGN PATENT DOCUMENTS

| | | |
|---|---|---|
| CN | 105705428 A | 6/2016 |
| CN | 106864838 A | 6/2017 |
| CN | 107000917 A | 8/2017 |
| DE | 228330 C | 11/1910 |
| DE | 20012051 U1 | 12/2000 |
| WO | 2006016270 A1 | 2/2006 |

OTHER PUBLICATIONS

Chinese Office Action dated Nov. 10, 2022 from counterpart Chinese Patent Application No. 202080056362.6.

* cited by examiner

MACHINE AND METHOD FOR FORMING CONTAINERS FROM BLANKS

This application is the National Phase of International Application PCT/IB2020/056995 filed Jul. 24, 2020 which designated the U.S.

This application claims priority to Italian Patent Application No. 102019000014418 filed Aug. 8, 2019, which application is incorporated by reference herein.

TECHNICAL FIELD

This invention relates to a machine and a method for forming containers from blanks.

These containers are used for packaging small-sized loose articles. For example, these containers may be used in the food industry for packaging loose confectionery products and the like. Generally speaking, these containers, for example, are shaped in such a way as to have a cross section that tapers from an upper portion of the container to a bottom portion of the container.

BACKGROUND ART

As is known, machines for forming containers are equipped with a conveyor provided with a plurality of pockets adapted to receive blanks (for example, tubular blanks, whether flat or pre-folded and partly glued) to move them along a path through operating stations which form them.

In this context, these containers have at least a main body defined by four side walls, a top opening (with upper end flaps) and a bottom opening (with lower end flaps). This container may be made of cardboard or other material suitable for containing the aforementioned small-sized loose articles.

Generally, the blanks from which these containers are made are worked with suitable means to make creases and/or lines of weakness on them so that they are more compliant during final folding.

Next, the blank is conveyed to a part of the machine where two side rails start folding two opposite walls and two folders fold the other two walls. The folders are provided with elements that capture one of the panels of the blank and push it in controlled manner so it is folded correctly.

At the end of this operation, the walls are in a folded position, defining the aforementioned cross section from the upper portion to the lower portion. At this point, the lower end flaps can be glued so as to hold the blank in this position.

Next, the container is filled and lastly the upper end flaps are also glued in order to close the container thus formed.

Disadvantageously, prior art machines and methods like the ones described above lack precision and/or are slow in operation to ensure optimum forming to prevent the container from opening during one of the later forming operations.

In other words, state of the art machines are based on a sequence of operations which, if not adequately coordinated, lead to non-optimal formation of the container or possible damage to it, making it unsuitable for containing the above mentioned loose articles.

AIM OF THE INVENTION

The technical purpose of this invention is therefore to provide a machine and a method for forming containers from blanks—for example, tubular blanks—which allow overcoming the above mentioned disadvantages of the prior art.

The aim of this invention is therefore to provide a machine and a method for forming containers from blanks to allow containers to be formed quickly and precisely.

The technical purpose indicated and the aim specified are substantially achieved by a machine for forming containers from blanks, comprising the technical features described in one or more of the appended claims 1 to 10, and by a method for forming containers from blanks, comprising the technical features described in one or more of the appended claims 11 to 13. The dependent claims correspond to possible embodiments of the invention.

The technical purpose and aim specified are substantially achieved by providing a machine for forming containers from blanks and comprising a plurality of shaping hoppers, each of which has a top mouth and a bottom mouth, opposite to each other and open to define a shaping through channel, and which are configured to receive respective blanks at the top mouth. Each hopper is internally provided with folding features giving the shaping channel a tapered cross-sectional shape in order to cause progressive folding of edges and/or side walls of the blank when the blank is inserted into the hopper. The machine also comprises an endless conveyor defining a feed path and on which are mounted in succession the hoppers and a plurality of pushing elements, each operating on one of the hoppers to push the respective blank into the shaping channel towards the bottom mouth so as to determine the progressive folding of edges and/or side walls of the blank and in such a way that end flaps of the blank protrude respectively from the top mouth and the bottom mouth. The pushing elements are movable in such a way as to follow the respective shaping hoppers along at least a stretch of the feed path and have a to-and-fro operating movement towards and away from the respective hopper along a direction transverse, preferably perpendicular, to the feed path. The machine also comprises folding means (see FIG. 5 (Prior Art) and FIG. 6 (Prior Art)) disposed on the feed path downstream of the pushing elements and configured to fold the end flaps of the blank inside the respective hopper, thus producing, respectively, a top closure and/or a bottom closure of the blank. The folding means (mechanism) is described in further detail in WO2006/016270 assigned to the present Applicant. The folding mechanism 9 includes a folder unit 12 to fold end flaps of the blanks.

Preferably, each pushing element comprises a plunger, operating on the hoppers to push the respective blank into the shaping channel in such a way that end flaps of the blank protrude from the bottom mouth, and a pushing frame, operating on upper end flaps of the blank in such a way that they protrude from the top mouth.

Preferably, the plunger has a tapered shape, and still more preferably, is shaped to match the shaping channel.

Preferably, the machine also comprises positioning means for positioning the blanks and movable in such a way as to follow the respective shaping hoppers along at least a stretch of the feed path.

Preferably, the machine is also provided with a filling station for filling the loose articles into the containers and located upstream of the folding means which are configured to close the top of each blank.

Advantageously, the machine is capable of forming the container without breaking any of the components of the blank.

Advantageously, the action of the pushing elements is such as to form the container precisely and at high speeds.

The technical purpose and aim specified are substantially achieved by a method for forming containers from blanks in a machine as described above, comprising the following steps:

feeding a pre-glued blank to a respective hopper having a top mouth and a bottom mouth, opposite to each other and open to define a shaping through channel and internally provided with folding features giving the shaping channel a tapered cross-sectional shape;

moving the hopper provided with a blank along a feed path;

with a pushing element which is movable in such a way as to follow the hopper and which has a to-and-fro operating movement towards and away from the hopper along a direction transverse, preferably perpendicular, to the feed path, pushing the blank into the shaping channel of the hopper so as to determine a progressive folding of edges and/or side walls of the blank and in such a way that end flaps of the blank protrude respectively from the top mouth and the bottom mouth;

with folding means disposed on the feed path downstream of the pushing elements, folding the end flaps of the blank to produce, respectively, a top closure and/or a bottom closure.

Further features and advantages of the present invention are more apparent in the indicative, hence non-limiting description of an embodiment of a machine and method for forming containers from blanks.

BRIEF DESCRIPTION OF THE DRAWINGS

The description is set out below with reference to the accompanying drawings which are provided solely for purposes of illustration without restricting the scope of the invention and in which.

DETAILED DESCRIPTION OF PREFERRED EMBODIMENTS OF THE INVENTION

With reference to the accompanying drawings, the numeral 1 denotes in its entirety a machine for forming containers C from blanks S; reference is made hereinafter to pre-glued tubular blanks S without loss of generality.

Figures 4A, 4B, 4C:
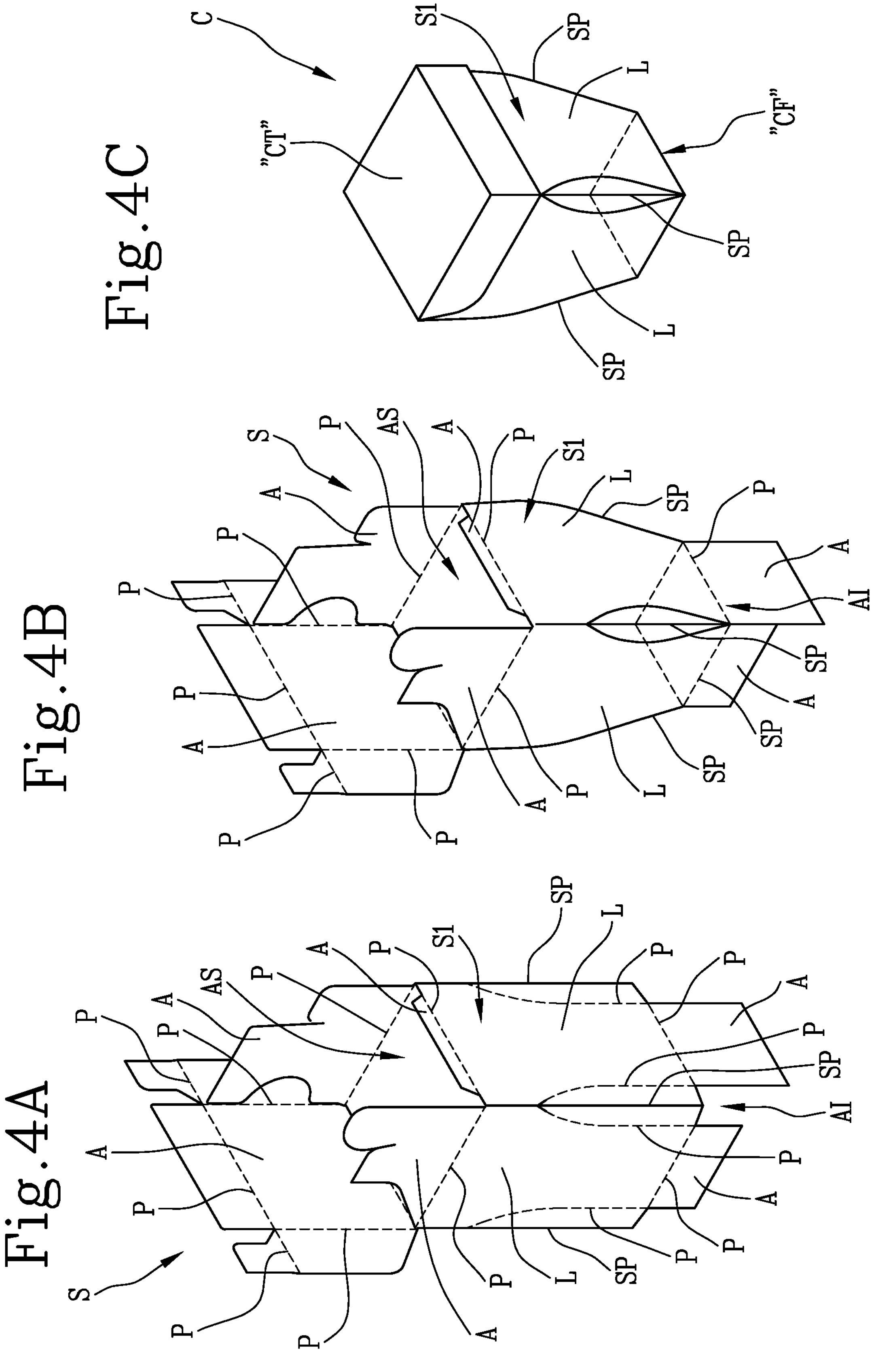
FIGS. 4A, 4B and 4C are perspective representations showing, respectively, a blank after a forming operation and a container.
Figure 5:
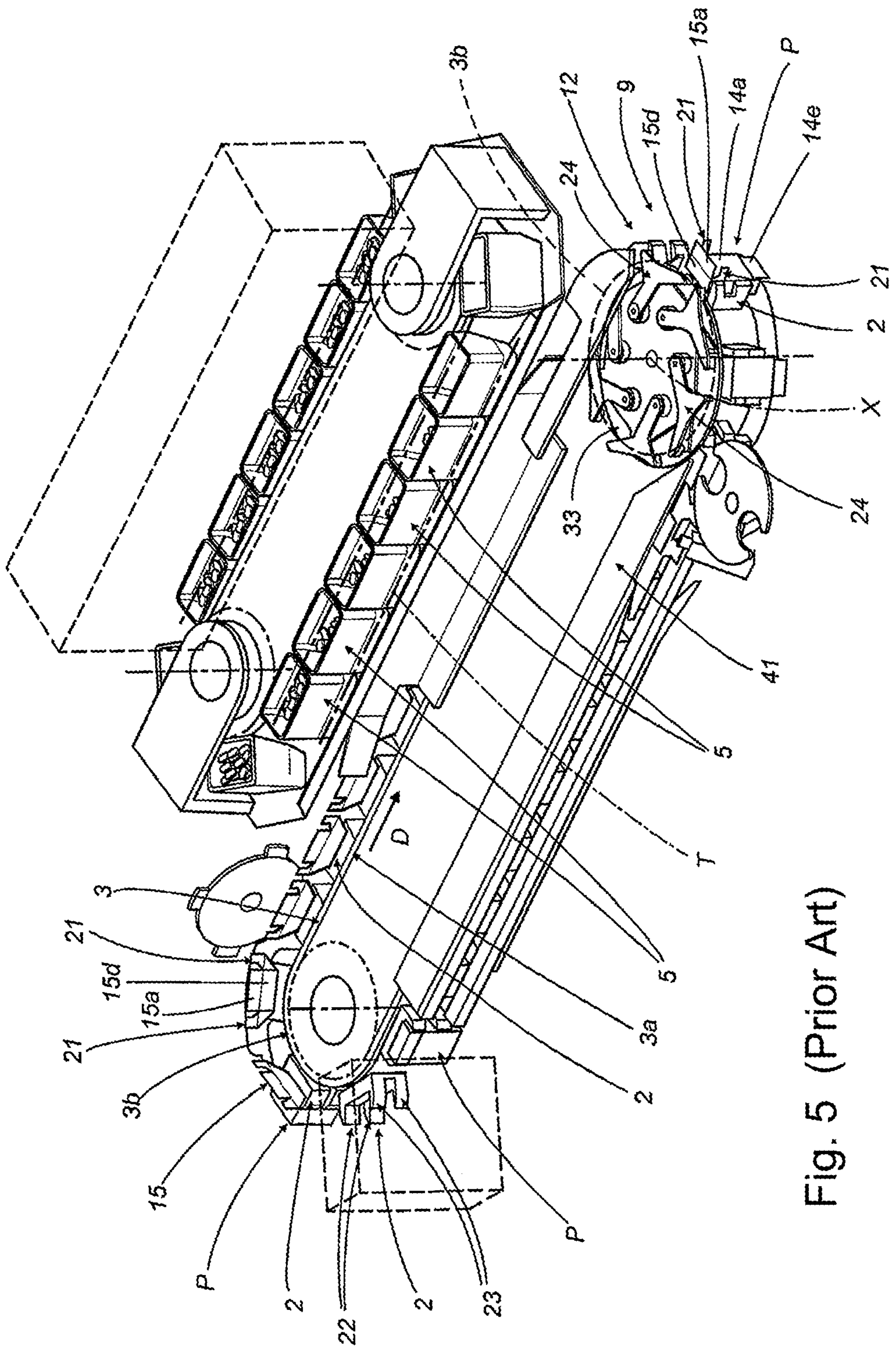
Fig. 5 (Prior Art)
FIG. 5 (Prior Art) and FIG. 6 (Prior Art) show a prior art folding means (mechanism) and a prior art machine incorporating such a folding means (mechanism).
Figure 6:
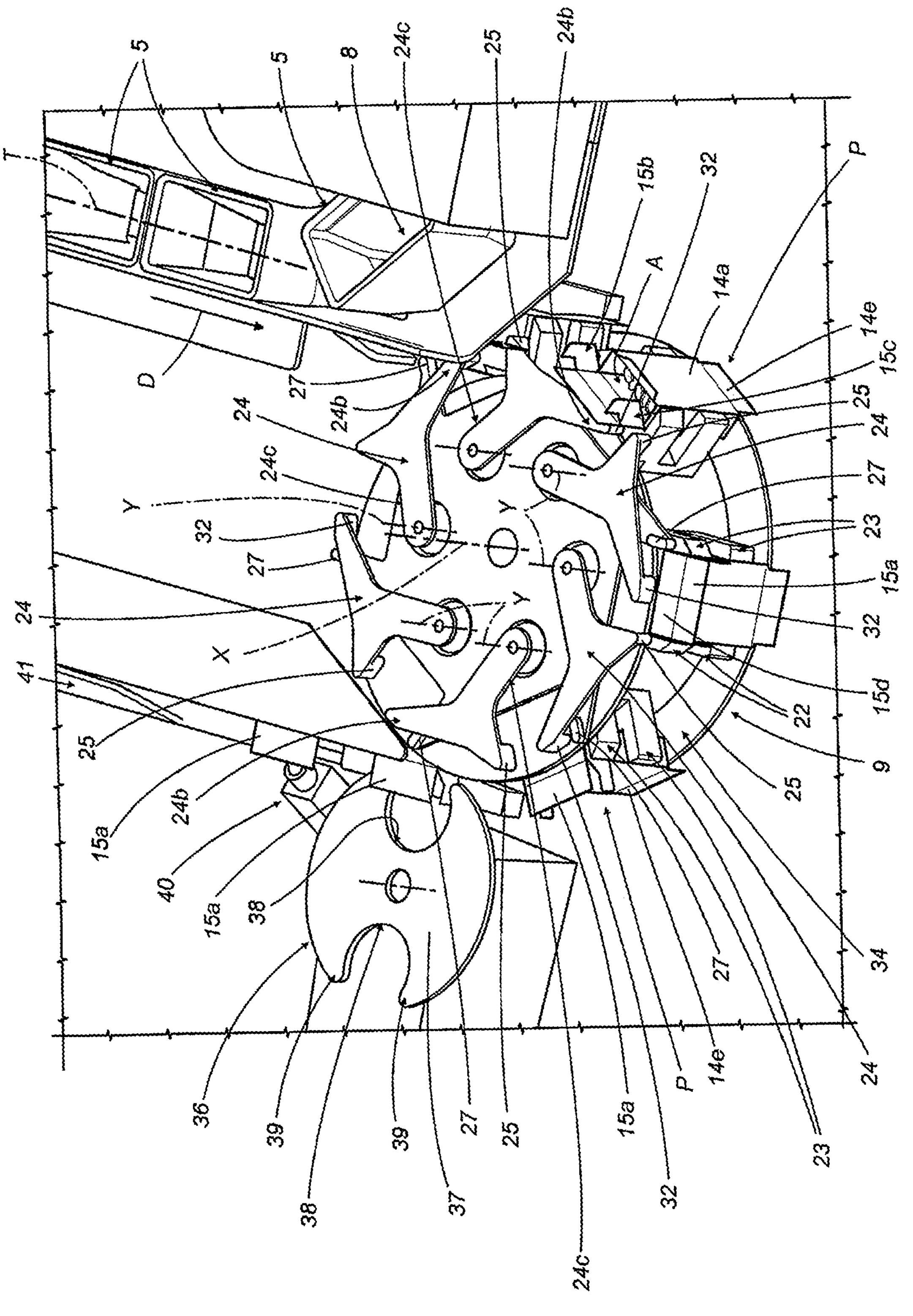
Fig. 6 (Prior Art)

By "tubular blanks" S are meant blanks, as shown for example in FIG. 4A, having a main body S1 defining side walls L, a top opening AS and a bottom opening AI, each opening being provided with respective end flaps A. The term "pre-glued" denotes blanks that are originally flat and are then folded, glued and flattened to define a partly formed blank that is ready to adopt the shape described above. In other words, before entering the machine 1, a flat blank is folded and glued in such a way that, when processed, its flattened shape will easily adopt a tubular shape with, for example, a substantially rectangular cross section.

Shown by way of example in FIG. 4A (as well as in FIG. 4B) is a tubular blank S having four side walls L and four end flaps A at its top opening AS and four end flaps A at its bottom opening AI (owing to the perspective view in the accompanying drawings, only two end flaps A are visible at the bottom opening AI). In other words, in the example embodiment represented in FIG. 4A, the tubular blank S has a main body S1 having the shape of a square base parallelepiped, extending in height and hollow at the bottom and top bases. Other shapes of the tubular blank S are imaginable but, for simplicity, this description refers to the embodiment of FIGS. 4A and 4B.

The blank therefore has a number of edges SP and several fold lines P located in proximity to the edges and to the lines joining the end flaps to the side walls L.

Once the container C has been formed, the bottom end flaps A (that is, the end flaps A located at the bottom opening AI) define a bottom closure CF of the container C.

Once the container C has been formed, the top end flaps A (that is, the end flaps A located at the top opening AS) define a top closure CT of the container C. Further, the top end flaps A may also be provided with additional fold lines P suitable for making the top closure CT.

The term "container" C is used to denote a box, as shown, for example, in FIG. 4C, having a main body S1 whose cross-sectional shape tapers from the top portion to the bottom portion of the main body S1 itself.

The main body S1 has a top closure CT at the top of it and a bottom closure CF at the bottom of it. The main body S1, the top closure CT and the bottom closure CF thus define a containing space in which to hold loose articles, specifically small-sized loose articles. For example, the container C is suitable for use in the food industry for packaging loose confectionery products and the like. The top closure CT can be opened by a user to gain access to the containing space in order to take out the loose articles contained therein.

FIG. 4B shows the tubular blank S formed by the machine 1 of this invention, where the main body S1 of the blank has a tapered cross-sectional shape and will define the main body S1 of the container C.

Figure 1:
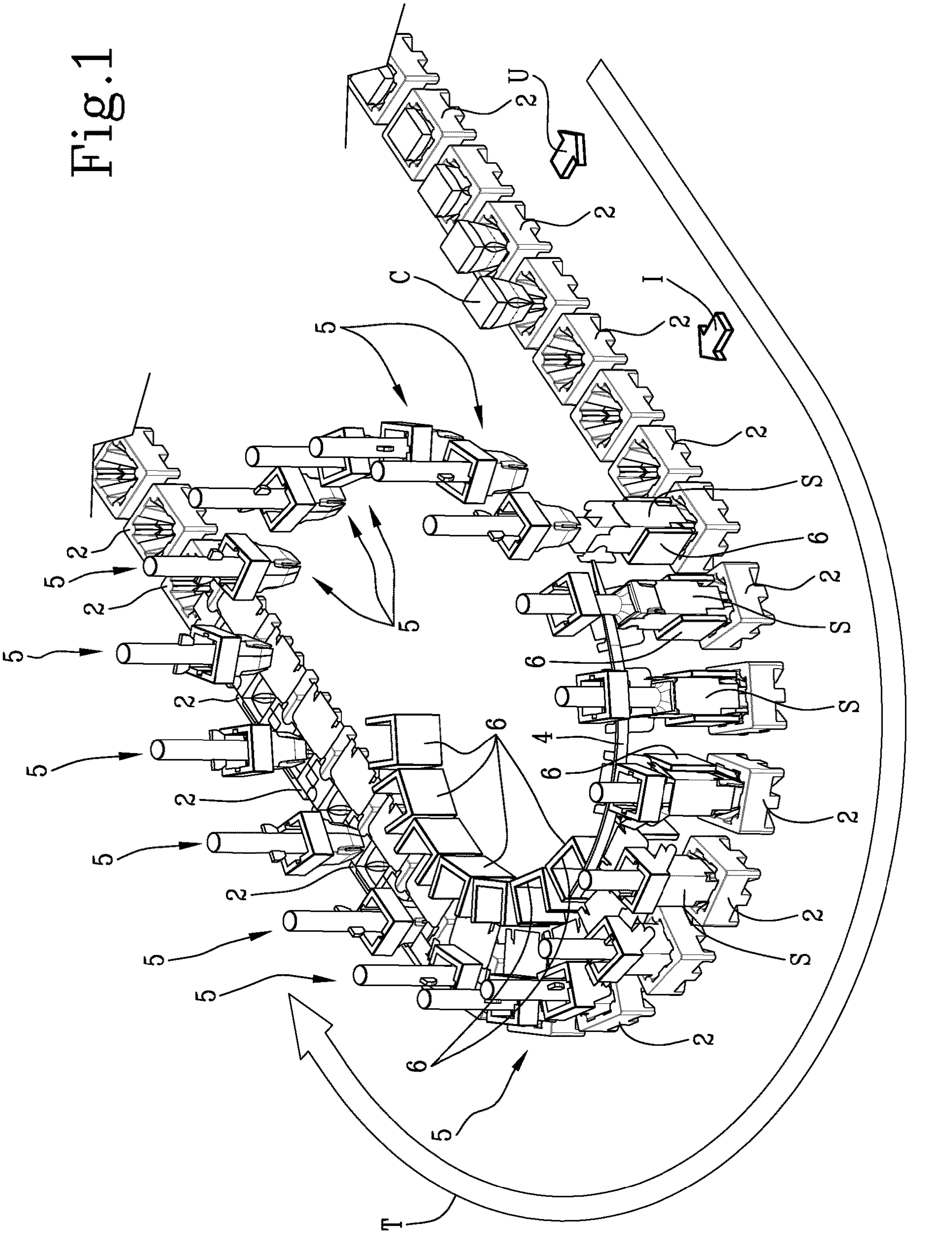
FIG. 1 is a schematic representation of a machine according to this invention.

The machine 1, as shown in FIG. 1, comprises a plurality of shaping hoppers 2 configured to receive respective blanks S.

Figure 2B:
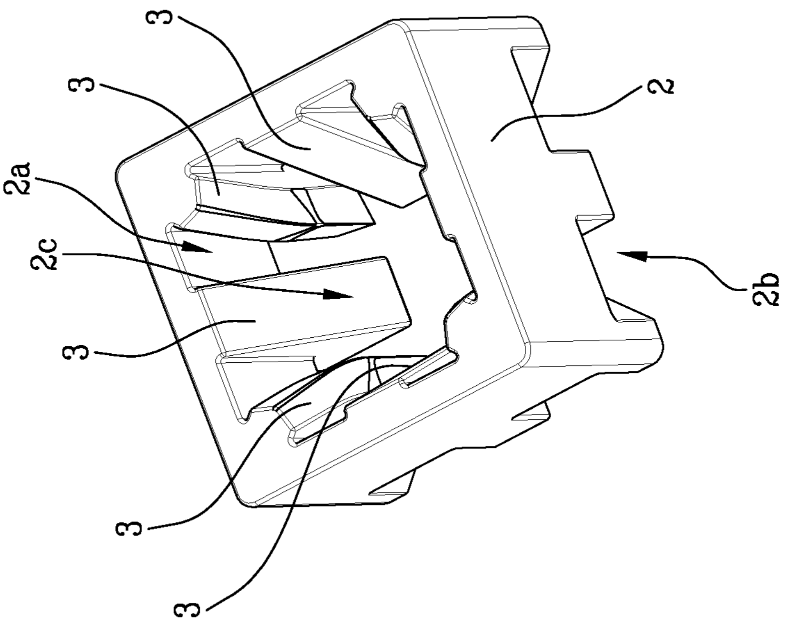
FIGS. 2A and 2B schematically represent components of the machine of FIG. 1.

As shown in FIG. 2B, each hopper 2 has at least one top mouth **2*a* and a bottom mouth 2*b*, opposite each other. The top mouth 2*a* and the bottom mouth 2*b* are open and define a shaping through channel 2*c*. The top mouth 2*a* is the part of the hopper 2 that is configured to initially receive the tubular blanks S. In other words, the hopper 2 is configured to receive a respective tubular blank S at the top mouth 2*a***.

Each hopper 2 is internally provided with folding features 3 giving the shaping channel **2*c* a tapered cross-sectional shape. In other words, the inside walls of the hopper 2 are provided with recesses and/or protuberances defining the folding features 3 which, in the example illustrated, give the shaping channel 2*c* a cross-sectional shape that tapers from the top mouth 2*a* to the bottom mouth 2*b*. The folding features 3 are made in such a way as to cause the edges SP and/or the side walls L of the tubular blank S to be progressively folded when the tubular blank S is inserted into the hopper 2. In other words, during insertion of the tubular blank S into the hopper 2, the folding features 3 press against the edges SP and/or the side walls L in such a way as to give the main body S1 of the container C the tapered cross-sectional shape. FIG. 2B shows a hopper with four inside walls, where each wall and corner is provided with respective folding features 3 which act both on the side walls L and on the edges SP of the tubular blanks S when they are inserted into the shaping channel 2_c_. Other shapes of the hoppers 2 (that is, of the inside walls of the shaping channel 2**_c_) are imaginable, based on the container C (that is, on the tubular blank S) to be formed.

In an embodiment not illustrated, the shaping channel 2_c_ may have a constant or tapered cross-sectional size.

The machine 1 also comprises a conveyor (not illustrated) defining a feed path T of the hoppers 2. The hoppers 2 are mounted one after the other in succession on the conveyor so they are transported along the feed path T. The conveyor moves the hoppers 2 continuously along the feed path T.

Preferably, the machine 1 also comprises a guide rail 4 which at least partly defines the feed path T in conjunction with the conveyor. More specifically, the guide rail 4 defines a curved stretch of the feed path T of the hoppers 2 [m1][BC2] (hence of the tubular blanks S).

Preferably, the feed path T is defined by two straight stretches and two curved stretches, forming a path having the shape substantially like that of a caterpillar track. Preferably, at the curved stretches, the conveyor is provided with suitable sprockets (not illustrated).

The machine 1 also comprises a plurality of pushing elements 5, each operating on at least one of the hoppers 2 to push a respective blank into the shaping channel 2_c_ towards the bottom mouth 2_b_. More specifically, the pushing elements 5 operate on the hoppers 2 in such a way as to cause the edges SP and/or the side walls L of the tubular blanks S to be progressively folded. The pushing action of the blank into the shaping channel 2_c_ towards the bottom mouth 2_b_ causes the end flaps A of the blank to protrude from the top mouth 2_a_ and the bottom mouth 2_b_ of the hoppers 2. In other words, following the pushing action applied by the pushing elements 5 on the tubular blanks S, the upper end flaps A protrude from the top mouth 2_a_ of a respective hopper 2 and the lower end flaps A protrude from the bottom mouth 2_b_.

More specifically, the pushing elements 5 are movable in such a way as to follow the respective shaping hoppers 2 along at least a stretch of the feed path T. Preferably, and as shown in the example embodiment of FIGS. 1 and 3, the pushing elements 5 are movable along the curved stretch of the feed path T.

As the pushing elements 5 follow the respective hoppers 2, they have a to-and-fro operating movement towards and away from the respective hopper 2 along a direction transverse to the feed path. Preferably, the to-and-fro operating movement is performed perpendicularly to the feed path T.

As shown in the accompanying drawings, the to-and-fro operating movement is performed coaxially with the shaping channel 2_c_.

In the embodiment of the accompanying drawings, the pushing elements 5 are movable on a closed path which is at least partly superposed on the feed path T. Preferably, the closed path has a circular shape. In the embodiment, the closed path is superposed on a circular stretch of the feed path T.

In an embodiment not illustrated, the pushing elements 5 are movable over a larger portion of the feed path T than in the embodiment described above. Preferably, in this example embodiment which is not illustrated, the closed path may be superposed on the entire feed path T of the hoppers 2.

Figure 2A:
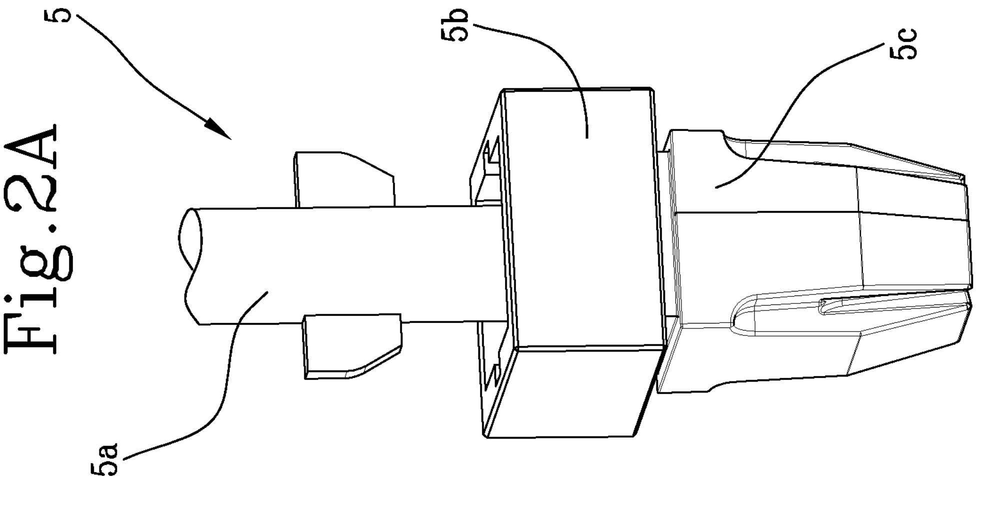

As shown in FIG. 2A, each pushing element 5 may comprise a plunger 5_a_ and a pushing frame 5_b_.

The plunger 5_a_ operates on the hoppers 2 to push the respective tubular blank S into the shaping channel 2_c_. That way, the plunger 5_a_, acting in conjunction with the shaping channel 2_c_, is able to give the main body S1 the tapered cross-sectional shape described above (and illustrated in FIGS. 4B and 4C). In addition, the plunger 5_a_ pushes the respective tubular blank S in such a way that the lower end flaps A protrude from the bottom mouth 2_b_.

The plunger 5_a_ has a tapered shape. Preferably, a top portion 5_c_ of the plunger has a tapered shape.

Preferably, the plunger 5_a_ (that is, the top portion 5_c_ thereof) is shaped to match the shaping channel 2_c_.

For example, and as shown in the embodiment of FIG. 2A, the plunger 5_a_ (that is, the top portion 5_c_ thereof) has four faces which are shaped to match and oppose the folding features 3 disposed along the inside surfaces of the hoppers 2 (that is, of the shaping channel 2_c_). The plunger 5_a_ (that is, the top portion 5_c_ thereof) also has corner portions defining recesses that are shaped to match the folding features 3 at the corner portions of the inside walls of the hoppers 2 (that is, of the shaping channel 2_c_).

Also imaginable are plungers 5_a_ with other shapes, depending on the shapes of the folding features 3 of the hoppers 2. In other words, based on the container C to be made, the shaping channel 2_c_ and the plunger 5_a_ (that is, the top portion 5_c_ thereof) are shaped differently to those described above.

The pushing frame 5_b_ operates on the tubular blank S, specifically on the upper end flaps A in such a way that they protrude from the top mouth 2_a_. More specifically, the pushing frame 5_b_ acts on the upper end flaps A in such a way that they are folded towards an outer portion of the tubular blank S. In the example embodiment, the pushing frame 5_b_ has four walls defining a channel which passes through top and bottom openings defined by the walls of the pushing frame 5_b_ itself. Other embodiments of the pushing frame 5_b_ are imaginable as a function of the shape of the container C to be formed (that is, of the tubular blank S). More specifically, the shape of the pushing frame 5_b_ may depend in particular on the number and/or distribution of the upper end flaps A defining the top closure CT of the container C.

The plunger 5_a_ and the pushing frame 5_b_ are configured in such a way as to move by translation relative to each other. More specifically, the relative translational movement is performed in such a way that the pushing frame 5_b_ causes the upper end flaps A to protrude after or at the same time as the blank S is pushed into the shaping channel 2_c_ by the plunger 5_a_.

In use, the plunger 5_a_ pushes the tubular blank S into the shaping channel 2_c_ and after that (or at the same time), the pushing frame 5_b_ operates to make the upper end flaps A protrude outside the main body S1 [m3] [BC4] of the tubular blank S.

Preferably, the plunger 5_a_ and the pushing frame 5_b_ are movable independently of each other. The term "independent" means that the pushing frame 5_b_ is moved by an actuator that is distinct from the actuator that is configured to move the plunger 5_a_. In other words, the up and down movement of the plunger 5_a_ is driven independently of the up and down movement of the pushing frame 5_b_. In other words, in a condition of use, although the plunger 5_a_ is moved before or at the same time as the pushing frame 5_b_, the pushing frame 5_b_ might move before the plunger 5_a_.

As shown in the accompanying drawings, the pushing frame 5_b_ is disposed coaxially around the plunger 5_a_. Preferably, the size of the pushing frame 5_b_ is such as to allow the plunger 5_a_ (that is, the top portion 5_c_ thereof) to pass through the channel defined by the walls of the pushing frame 5_b_. In other words, the dimensions of the channel defined by the walls of the pushing frame 5*b* are greater than or approximately equal to those of the plunger 5*a* (that is, of the top portion 5*c* thereof).

In the embodiment of the accompanying drawings, the machine 1 also comprises positioning elements 6 for positioning the blanks S.

The positioning elements 6 have a transverse cross section that is substantially C-shaped so they can correctly hold respective tubular blanks S to position them correctly at respective hoppers 2 and pushing elements 5.

The positioning elements 6 are movable in such a way as to follow the respective shaping hoppers 2. More specifically, the positioning elements 6 follow the respective hoppers 2 along at least a stretch of the feed path T. The positioning elements 6 therefore also follow the pushing elements 5.

Preferably, the positioning elements 6 are movable on a respective closed path which is partly superposed on the closed path of the pushing elements 5. As shown in the accompanying drawings, the positioning elements 6 may be superposed on the closed path of the pushing elements 5 in an initial portion where the pushing elements 5 follow the hoppers 2 being transported by the conveyor.

Preferably, the respective closed path of the positioning elements 6 is circular.

Each positioning element 6 is movable along the respective closed path between an engaged configuration, where it engages the respective tubular blank S, and a disengaged configuration.

By "engaged configuration" is meant that the positioning element 6 fits around the respective tubular blank S in such a way as to engage a respective pushing element 5. In other words, the engaged configuration corresponds to a respective position where the positioning element 6 keeps the tubular blank S aligned with the respective hoppers 2 and with the pushing elements 5. The engaged configuration is maintained until the pushing elements 5 start pushing the tubular blank S into the shaping channel 2*c*. In the engaged configuration, the positioning elements 6 allow holding the tubular blank S in such a way as to overcome the shape memory of the tubular blank S which would cause it to open and return to its flat blank configuration.

By "disengaged configuration" is meant a configuration in which the positioning element 6 allows the respective pushing element 5 to push the tubular blank S into the shaping channel 2*c*. In other words, the disengaged configuration corresponds to a position where the positioning element 6 is spaced from the respective blank S so that the pushing element 5, now engaged with the tubular blank S, can push the tubular blank S into the shaping channel 2*c* without interference.

In other words, the engaged configuration corresponds to a configuration where the positioning element 6, in the portion of the respective closed path superposed on the feed path T of the hoppers 2 and on the closed path of the pushing elements 5, is aligned with (that is, coaxially positioned) relative to the hoppers 2 and to the pushing elements 5, while the disengaged configuration corresponds to moving the positioning element 6 away so it is not aligned with the hoppers 2 and the pushing elements 5.

The machine 1 also comprises folding means (not illustrated) located on the feed path T, downstream of the pushing elements 5. The folding means are configured to fold the end flaps A of the tubular blank S which has been inserted into the hopper 2, to make the top closure CT and/or the bottom closure CF of the tubular blank S.

The folding means may be located in the same portion of the feed path T so that they are aligned and can fold both the lower and the upper end flaps A while the hoppers 2 move forward.

Alternatively, the folding means may be located in different portions of the feed path. For example, the lower folding means, which are configured to fold the lower end flaps A to make the bottom closure CF, may be located upstream of the upper folding means, which are configured to fold the upper end flaps A to make the top closure CT, or vice versa.

Preferably, the machine 1 is also provided with gluing means (not illustrated), located upstream of the folding means (or of each folding means) and configured to glue portions of the upper and lower end flaps A. That way, once the folding means have folded them, the end flaps A are glued to each other to form the top closure CT and the bottom closure CF.

Preferably, in a further embodiment not illustrated, the machine 1 also comprises a filling station for filling the loose articles into the containers C and located upstream of the upper folding means which are configured to make the top closure CT of the tubular blank S. In other words, the filling station is configured to fill the tubular blank S whose lower end flaps A have already been folded by the bottom folding means to form the bottom closure CF. In other words, the filling station is located upstream of the upper end flaps A and downstream of a folding means for folding the lower end flaps.

In use, the machine 1 described above is fed with the tubular blanks S in a portion of the feed path represented by the IN arrow I in FIG. 1. The tubular blanks S are inserted by aligning them with a respective hopper 2, transported by the conveyor along the feed path T, and with a respective pushing element 5. Preferably, in the case where the positioning elements 6 are provided, the tubular blanks S are inserted into the positioning elements in such a way as to overcome their shape memory and to align the tubular blanks S correctly relative to the hoppers 2 and pushing elements 5. More specifically, the tubular blanks S are fed in succession to the empty hoppers 2 being transported by the conveyor in the proximity of the portion of the feed path T indicated by the IN arrow I.

Figure 3:
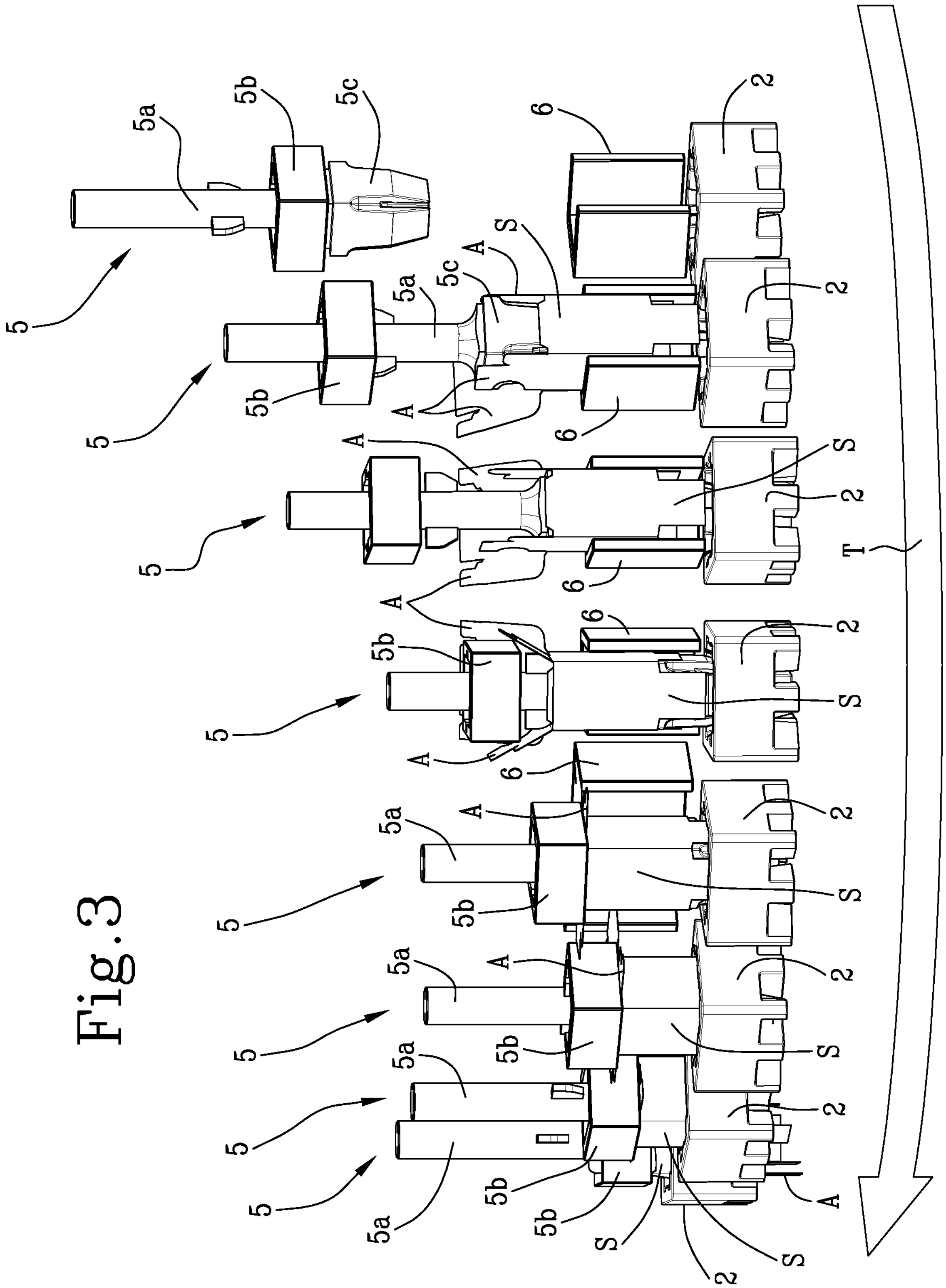
FIG. 3 schematically represents a forming operation performed by the machine of FIG. 1.

At this point, as shown for example in FIG. 3, the pushing elements 5 perform their to-and-fro movement along the portion of the closed path of the pushing elements 5 which is superposed on the portion of the feed path T of the hoppers 2. FIG. 3 shows different pushing elements 5 that push different tubular blanks S but FIG. 3 may also be understood as representing different instants defining the movement of one pushing element 5 applying the pushing action on a respective tubular blank S. Looking at FIG. 3, the instants representing this movement are ordered from right to left.

More specifically, the pushing element 5 starts its movement by advancing towards the respective hopper 2 while at the same time following the hopper 2. The pushing element 5 moves down towards the hopper 2 until its engages the respective tubular blank S and is inserted into it. Preferably, in the embodiment illustrated in the accompanying drawings, the plunger 5*a* (that is, the top portion 5*c* thereof) is inserted into the main body S1 of the tubular blank S through the top opening AS. Where the presence of the positioning elements 6 is contemplated, once the pushing element 5 has engaged the respective tubular blank S, the positioning elements 6 move away from the tubular blank S, passing from the engaged configuration to the disengaged configuration.

Next, the plunger 5*a* and the pushing frame 5*b* move in such a way as to push the tubular blank into the shaping channel 2*c*. Alternatively, the pushing frame 5*b* may apply the pushing action after the pushing action applied by the plunger 5*a*.

More specifically, the plunger 5*a* (that is, the top portion 5*c* thereof) pushes the main body S1 against the folding features 3 of the hoppers 2 in such a way as to give the tubular blank S the tapered cross-sectional shape, shown in FIG. 4B, and to make the lower end flaps A protrude from the bottom mouth 2*b* of the hopper 2. Further, the pushing frame 5*b* allows pushing the main body S1 further into the shaping channel 2*c* so that the upper end flaps A protrude from the top mouth 2*a* of the hopper 2. More specifically, the pushing frame 5*b* folds the upper end flaps A (at the respective fold lines P) in such a way that they are folded towards an outer portion of the main body S1. At this point, the pushing element 5 concludes its to-and-fro movement by moving away from the respective hopper 2. This movement may be performed by moving away the plunger 5*a* and the pushing frame 5*b* simultaneously or moving first one and then the other, or vice versa.

Advantageously, the to-and-fro movement of the pushing elements 5 allows the tubular blank S to be formed quickly and precisely. More specifically, the pushing action allows inserting the tubular blank S into the respective hopper 2 in such a way that it is held firmly and in a compressed state as it moves along the feed path T so as to give the main body S1 the tapered cross-sectional shape by overcoming the shape memory which very often makes the processes of prior art machines difficult and/or relatively imprecise.

After the tubular blank S has been inserted into the shaping channel 2*c* to obtain a tubular blank S like the one shown, for example, in FIG. 4B, the hoppers 2 continue along the feed path T until they reach the folding means. The folding means fold the end flaps A to form the bottom closure CF and the top closure CT, thereby making the container C.

Preferably, if the filling station is present, first the bottom closure CF is formed, then the main body S1 is filled and, after that, the top closure CT is formed, thereby making the full container C.

At this point, the container C is extracted from the respective hopper 2 in the proximity of the OUT arrow U, shown by way of example in FIG. 1, so that in the proximity of the IN arrow, a hopper 2 is now empty and free to receive another tubular blank S to be formed.

This invention also has for an object a method to form containers C from pre-glued tubular blanks S. The method is carried out in a machine 1 like the one described in the foregoing (that is, in accordance with one of the embodiments described above).

The method comprises a step of feeding a pre-glued tubular blank S to a respective hopper 2. The hopper 2 has a top mouth 2*a* and a bottom mouth 2*b*, opposite to each other and open to define a shaping through channel 2*c*, and internally provided with folding features 3 which give the shaping channel 2*c* a tapered cross-sectional shape.

Preferably, the method may also comprise a preliminary step of folding and gluing a flat blank in order to obtain the tubular structure of the tubular blank S. In other words, the method may comprise a step of making a tubular blank S that is pre-glued prior to the step of feeding the tubular blank S to the respective hopper 2.

Next, the method comprises moving the hopper 2, provided with a tubular blank S, along a feed path T.

The method also comprises pushing the tubular blank S into the shaping channel 2*c* of the hopper 2 by means of a pushing element 5 which is movable in such a way as to follow the hopper 2 and which has a to-and-fro operating movement towards and away from the hopper 2 along a direction transverse, preferably perpendicular, to the feed path T. This pushing action allows determining a progressive folding of edges SP and/or side walls L of the tubular blank S and in such a way that end flaps A of the tubular blank S protrude respectively from the top mouth 2*a* and bottom mouth 2*b*.

The step of pushing preferably comprises pushing the tubular blank S into the shaping channel 2*c* by means of a plunger 5*a*, having a tapered shape, preferably matching the shaping channel 2*c*.

The step of pushing preferably comprises folding the end flaps A by means of a pushing frame 5*b* after, or at the same time as, the step of pushing with the plunger 5*a*.

The sub-steps of pushing and folding are accomplished by moving the plunger 5*a* and the pushing frame 5*b* relative to each other.

The method also comprises folding the end flaps A of the tubular blank S to produce, respectively, a top closure CT and/or a bottom closure CF by means of folding means disposed along the feed path T downstream of the pushing elements 5.

The method may also comprise the steps of housing a tubular blank S in a positioning element 6 and moving the positioning element 6 so it follows a respective hopper 2. The movement is performed along at least one stretch of the feed path T. That way, the method allows keeping the tubular blanks S aligned with the respective hoppers 2.

Moreover, the method comprises moving the positioning element 6 away from the feed path T once the pushing element 5 has started the step of pushing. Thus, the method allows the tubular blank S to be pushed into the shaping channel 2*c* without interference.

Preferably, the method also comprises a step of filling the tubular blank S, carried out between a step of folding the lower end flaps A and a step of folding the upper end flaps A.

Advantageously, this invention is capable of overcoming the disadvantages of the prior art.

Advantageously, the machine 1 is capable of forming containers C from tubular blanks S, at high speed and with a high degree of precision.

More specifically, the machine 1 is capable of implementing this forming process with a reduced number of steps compared to the machines and/or the methods used in the prior art and is also capable of solving the problem of imprecision caused by the shape memory of the tubular blanks S themselves.

Advantageously, the machine 1 is able to prevent damage to the tubular blanks S being formed and thus offers a sure economic advantage.

The invention claimed is:

1. A machine for forming containers from blanks, comprising:

a plurality of shaping hoppers, each including a top mouth and a bottom mouth, opposite to each other and open to define a through shaping channel, the shaping hoppers being configured to receive respective blanks at the top mouth, wherein each of the shaping hoppers internally includes folding features, giving the shaping channel a tapered cross-sectional shape, to cause progressive folding of edges and/or side walls of the blank when the blank is inserted into the each of the shaping hoppers;

an endless conveyor which defines a feed path and on which the shaping hoppers are mounted in succession;

a plurality of pushing elements, each operating on at least one of the shaping hoppers to push the respective blank into the shaping channel so as to determine the progressive folding of edges and/or side walls of the blank and in such a way that end flaps of the blank protrude respectively from the top mouth and the bottom mouth, the pushing elements being movable in such a way as to follow the respective shaping hoppers along at least a stretch of the feed path and having a to-and-fro operating movement towards and away from the respective shaping hoppers along a direction perpendicular to the feed path;

the endless conveyor configured to move the shaping hoppers downstream to a folding mechanism to fold the end flaps of the blank inside the respective shaping hoppers, thus producing, respectively, a top closure and/or a bottom closure of the blank.

2. The machine according to claim 1, wherein the pushing elements are movable on a circular path, which is at least partly superposed on the feed path.

3. The machine according to claim 1, wherein each of the pushing elements comprises a plunger, operating on the shaping hoppers to push the respective blank into the shaping channel such that end flaps of the blank protrude from the bottom mouth and a pushing frame operating on upper end flaps of the blank in such a way that they protrude from the top mouth.

4. The machine according to claim 3, wherein the plunger and the pushing frame are configured such that they move translationally relative to each other so that the pushing frame folds the end flaps after or at a same time as the plunger pushes the blank into the shaping channel.

5. The machine according to claim 3, wherein the plunger and the pushing frame are movable independently of each other.

6. The machine according to claim 3, wherein the pushing frame is disposed coaxially around the plunger.

7. The machine according to claim 3, wherein the plunger has a tapered shape matching the shaping channel.

8. The machine according to claim 1, further comprising positioning elements for positioning the blanks and movable in such a way as to follow the respective shaping hoppers along at least a stretch of the feed path, the positioning elements being movable towards and away from the feed path and transversely thereto, the positioning elements being movable radially relative to a circular stretch of the feed path.

9. The machine according to claim 8, wherein each positioning element is movable along the respective closed path of the positioning element between an engaged configuration with a respective blank, where the positioning element fits around the respective blank to engage a respective pushing element with the blank, and a disengaged configuration, where the positioning element is spaced from the respective blank to allow the respective pushing element to push the respective blank into the shaping channel.

10. The machine according to claim 8, wherein the positioning elements have an open shape suitable for fitting around a tubular blank; the positioning elements being C-shaped.

11. A method for forming containers from blanks, comprising the following steps:

feeding a pre-glued blank to a respective shaping hopper having a top mouth and a bottom mouth, opposite to each other and open to define a shaping through channel and internally provided with folding features, giving the shaping channel a tapered cross-sectional size;

moving the shaping hopper provided with a blank along a feed path;

with a pushing element which is movable in such a way as to follow the shaping hopper and which has a to-and-fro operating movement towards and away from the shaping hopper along a direction perpendicular, to the feed path, pushing the blank into the shaping channel of the shaping hopper so as to determine a progressive folding of edges and/or side walls of the blank and in such a way that end flaps of the blank protrude respectively from the top mouth and the bottom mouth;

downstream of the pushing elements, folding the end flaps of the blank to produce, respectively, a top closure and/or a bottom closure.

12. The method according to claim 11, wherein the step of pushing is carried out through the following sub-steps:

with a plunger, having a tapered shape, matching the shaping channel, pushing the blank into the shaping channel;

after or at the same time as the sub-step of pushing with the plunger, folding the end flaps by a pushing frame, the sub-steps of pushing and folding being accomplished by moving the plunger and the pushing frame relative to each other.

13. The method according to claim 11, comprising the following steps:

accommodating a blank in a positioning element;

moving the positioning element so it follows a respective shaping hopper, the movement being performed along at least a stretch of the feed path;

moving the positioning element away from the feed path once the pushing element has started the step of pushing.

* * * * *